US010300916B2

(12) United States Patent
Goto et al.

(10) Patent No.: US 10,300,916 B2
(45) Date of Patent: May 28, 2019

(54) AUTONOMOUS DRIVING ASSISTANCE SYSTEM, AUTONOMOUS DRIVING ASSISTANCE METHOD, AND COMPUTER PROGRAM

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Hirohiko Goto, Chiryu (JP); Yuji Sato, Owariasahi (JP); Kuniaki Tanaka, Nagoya (JP); Masaki Takano, Susono (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/554,629

(22) PCT Filed: Mar. 30, 2016

(86) PCT No.: PCT/JP2016/060543
§ 371 (c)(1),
(2) Date: Aug. 30, 2017

(87) PCT Pub. No.: WO2016/159171
PCT Pub. Date: Oct. 6, 2016

(65) Prior Publication Data
US 2018/0237018 A1  Aug. 23, 2018

(30) Foreign Application Priority Data

Mar. 31, 2015  (JP) ................................ 2015-074404

(51) Int. Cl.
*B60W 30/18*  (2012.01)
*G06K 9/00*  (2006.01)
(Continued)

(52) U.S. Cl.
CPC ...... *B60W 30/18163* (2013.01); *B60W 30/12* (2013.01); *B60W 30/14* (2013.01);
(Continued)

(58) Field of Classification Search
USPC ........................................................ 701/26
See application file for complete search history.

(56) References Cited

U.S. PATENT DOCUMENTS 6,577,334 B1  6/2003  Kawai et al.
9,562,787 B2 *  2/2017  Kojima .............. G01C 21/3658
(Continued)

FOREIGN PATENT DOCUMENTS

JP  H07295633 A  11/1995
JP  2000105898 A  4/2000
(Continued)

OTHER PUBLICATIONS

Jun. 28, 2016 International Search Report issued in Patent Application No. PCT/JP2016/060543.
(Continued)

*Primary Examiner* — Tyler D Paige
(74) *Attorney, Agent, or Firm* — Oliff PLC

(57) ABSTRACT

Autonomous driving assistance systems, methods, and programs obtain road information that specifies line types of lane markings and connection types of lanes and specify, when a vehicle travels with autonomous driving assistance, a planned route to be taken by the vehicle based on the road information. The systems, methods, and programs execute the autonomous driving assistance for the vehicle according to the specified planned route.

8 Claims, 11 Drawing Sheets

(51) Int. Cl.
  *B60W 30/14* (2006.01)
  *B60W 30/12* (2006.01)
  *G05D 1/00* (2006.01)
  *G05D 1/02* (2006.01)
  *G01C 21/36* (2006.01)
  *B62D 15/02* (2006.01)

(52) U.S. Cl.
  CPC ..... *B62D 15/0255* (2013.01); *G01C 21/3658* (2013.01); *G05D 1/0088* (2013.01); *G05D 1/0212* (2013.01); *G05D 1/0274* (2013.01); *G06K 9/00798* (2013.01); *G05D 2201/0213* (2013.01)

(56) References Cited

U.S. PATENT DOCUMENTS

| | | |
|---|---|---|
| 2006/0178824 A1 | 8/2006 | Ibrahim |
| 2010/0246889 A1* | 9/2010 | Nara ............... G06K 9/00798 382/104 |
| 2012/0083964 A1* | 4/2012 | Montemerlo .......... G06T 7/223 701/26 |
| 2012/0123672 A1* | 5/2012 | Kojima ............. G01C 21/3658 701/410 |
| 2013/0110343 A1 | 5/2013 | Ichikawa et al. |
| 2015/0177007 A1* | 6/2015 | Su ..................... G01C 21/34 701/25 |
| 2015/0253778 A1 | 9/2015 | Rothoff et al. |
| 2015/0307130 A1* | 10/2015 | Kimura ................. B60W 30/10 701/41 |
| 2015/0316387 A1* | 11/2015 | Ichikawa ........... G01C 21/3658 701/532 |
| 2018/0211533 A1* | 7/2018 | Nakajima ................ G08G 1/00 |
| 2018/0224295 A1* | 8/2018 | Nakajima .......... G01C 21/3602 |

FOREIGN PATENT DOCUMENTS

| | | |
|---|---|---|
| JP | 2010221859 A | 10/2010 |
| JP | 2013181959 A | 9/2013 |
| WO | 2011/158347 A1 | 12/2011 |

OTHER PUBLICATIONS

U.S. Appl. No. 15/554,641, filed Aug. 30, 2017 in the name of Goto et al.

Jun. 28, 2016 International Search Report issued in Patent Application No. PCT/JP2016/060544.

Jan. 28, 2019 Office Action issued in U.S. Appl. No. 15/554,641.

* cited by examiner

CANDIDATE VEHICLE POSITIONS
IN PLURALITY OF LANES

AUTONOMOUS DRIVING ASSISTANCE SYSTEM, AUTONOMOUS DRIVING ASSISTANCE METHOD, AND COMPUTER PROGRAM

TECHNICAL FIELD

Related technical fields include autonomous driving assistance systems, methods, and programs which execute autonomous driving assistance for vehicles.

BACKGROUND

In recent years, in addition to manual driving in which a vehicle travels based on user's driving maneuvers, a new drive mode has been proposed regarding autonomous driving assistance systems that assist the user in driving a vehicle by performing a part or all of user's driving maneuvers by the vehicle. For example, the autonomous driving assistance system autonomously performs vehicle control such as control of steering, a driving source, and a brake so as to keep the vehicle approximately centered in the same lane while maintaining a preset vehicle speed and a certain distance to a vehicle ahead. The autonomous driving assistance system is advantageous in that it eases the driving burden on the user. However, in order to allow the vehicle to appropriately travel with autonomous driving assistance, it is important to more quickly and accurately specify a route to be taken by the vehicle.

For example, as shown in FIG. 16, in the case where a straight road 102 and a curved road 103 are connected at a branch point ahead of a vehicle traveling on a road 101, control for autonomous driving assistance varies depending on which way the vehicle is going to go at the branch point. That is, in the case where the vehicle is going to take the curved road 103, the vehicle needs to be decelerated to a speed according to the radius of curvature of the curve by the time the vehicle enters the curve. In the case where the vehicle is going to take the straight road 102, such deceleration is not needed, and it is desirable that the vehicle travel at as constant a speed as possible so as not to impede traffic flow. Accordingly, appropriate autonomous driving assistance cannot be executed unless a route to be taken by the vehicle can be specified. For example, International Publication No. 2011/158347 (WO 2011/158347) proposes a technique in which, in the case where a destination has been set, autonomous driving assistance is executed by using a route to the destination as the course of the vehicle, and in the case where no destination has been set, autonomous driving assistance is executed by using a route along the road as the course of the vehicle.

SUMMARY

As used herein, the expression "along the road" basically specifies the relationship between roads. Which road has the relationship of "along the road" with which road is basically artificially set by cartographic companies that produce map information. Accordingly, in WO 2011/158347, in the case where the straight road 102 has been set to have the relationship of "along the road" with the road 101 and the vehicle is traveling toward the branch shown in FIG. 16 with no destination being set, autonomous driving assistance is executed based on the presumption that the vehicle is going to take the straight road 102 rather than the curved road 103. In the example shown in FIG. 16, however, the leftmost lane of the road 101 is connected to the curved road 103, and the vehicle is not necessarily going to take the straight road 102. Especially in the case where the vehicle is traveling on the leftmost lane, there is also a high possibility that the vehicle may be going to take the curved road 103. In this case, since the vehicle traveling with autonomous driving assistance is going to make a lane change from the leftmost lane of the road 101 to the straight road 102, the driver needs to perform vehicle maneuvers so that the vehicle does not make a lane change from the leftmost lane of the road 101 to the straight road 102. That is, in WO 2011/158347, a vehicle's planned route ahead of the vehicle in the direction in which the vehicle is traveling is determined based on the relationship of "along the road" between roads which is artificially set by cartographic companies that produce map information, and without using the "line types of lane markings" and the "connection types of lanes" as information specifying classification of lanes of roads and road connection for each lane. Accordingly, a planned route cannot be appropriately specified.

Exemplary embodiments of the broad inventive principles described herein provide an autonomous driving assistance system, an autonomous driving assistance method, and a computer program, which allow a planned route to be taken by a vehicle to be specified by using the "line types of lane markings" and the "connection types of lanes" and which particularly allow a planned route to be taken by a vehicle to be more quickly and accurately specified as compared to conventional examples even when a guidance route has not been set.

Exemplary embodiments provide autonomous driving assistance systems, methods, and programs that obtain road information that specifies line types of lane markings and connection types of lanes and specify, when a vehicle travels with autonomous driving assistance, a planned route to be taken by the vehicle based on the road information. The systems, methods, and programs execute the autonomous driving assistance for the vehicle according to the specified planned route.

The term "autonomous driving assistance" refers to the function to perform at least a part of driver's vehicle maneuvers on behalf of the driver or to assist the driver with at least a part of driver's vehicle maneuvers.

According to the autonomous driving assistance system, the autonomous driving assistance method, and the computer program which have the above configuration, a planned route to be taken by the vehicle can be specified by using the "line types of lane markings" and the "connection types of lanes." In particular, even if a guidance route has not been set, a planned route to be taken by the vehicle can be more quickly and accurately specified as compared to conventional examples as the planned route to be taken by the vehicle is specified based on classification of lanes located ahead in the direction in which the vehicle is traveling and road connection for each lane. This allows the vehicle to appropriately travel with autonomous driving assistance based on the specified planned route.

DETAILED DESCRIPTION OF EXEMPLARY EMBODIMENTS

Figure 1:
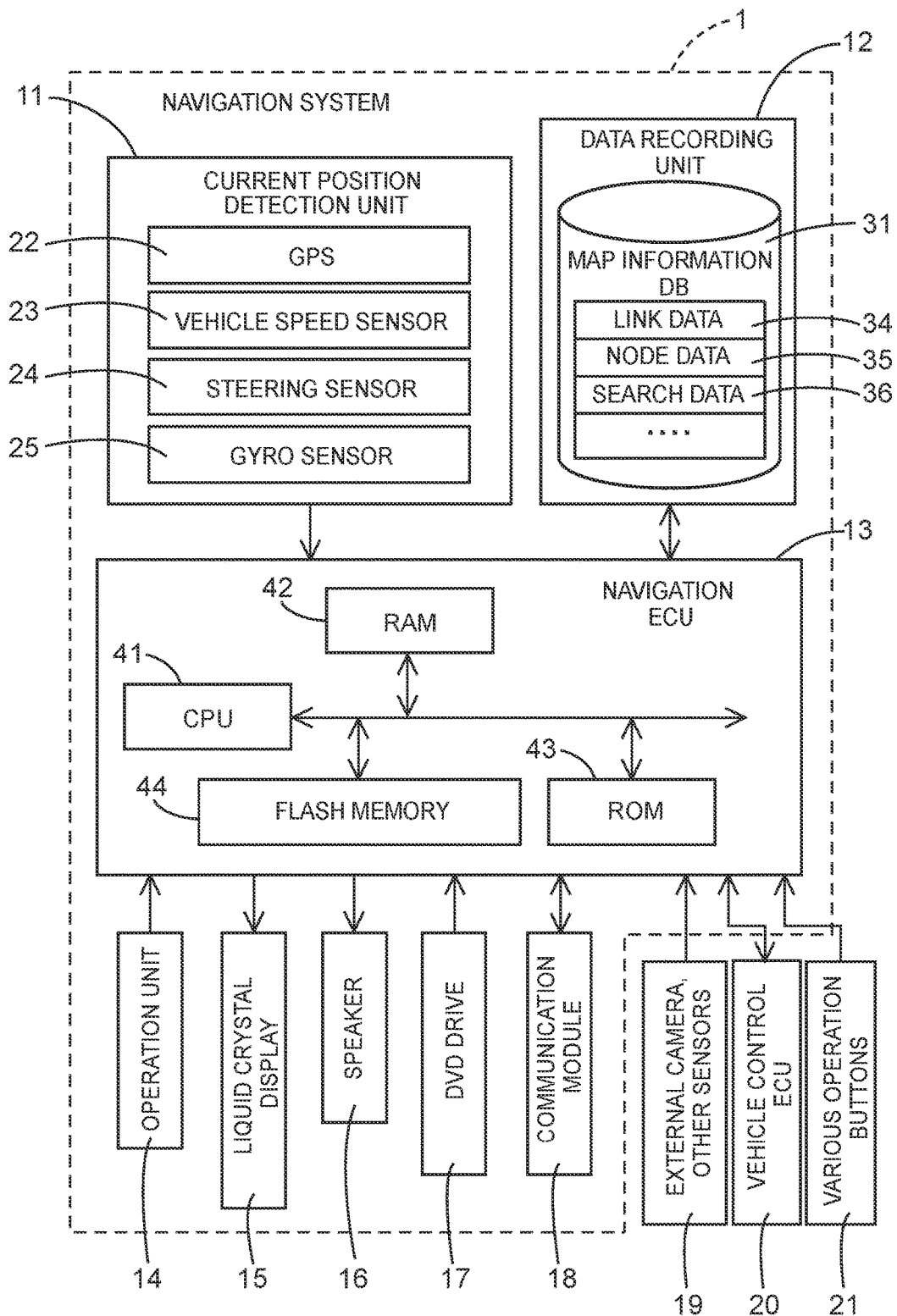
FIG. 1 is a block diagram showing the configuration of a navigation system according to an embodiment.

An autonomous driving assistance system will be described in detail below based on an embodiment of a navigation system with reference to the accompanying drawings. First, the general configuration of a navigation system 1 according to an embodiment will be described with reference to FIG. 1. FIG. 1 is a block diagram of the navigation system 1 according to the embodiment.

As shown in FIG. 1, the navigation system 1 according to the embodiment is comprised of: a current position detection unit 11 that detects the current position of a vehicle equipped with the navigation system 1; a data recording unit 12 having various data recorded thereon; a navigation ECU 13 that performs various arithmetic operations based on received information; an operation unit 14 that accepts user's operations; a liquid crystal display 15 that displays to the user a map around the vehicle, information about a guidance route set by the navigation system 1, etc.; a speaker 16 that outputs voice guidance about the route guidance; a DVD drive 17 that reads a DVD serving as a storage medium; and a communication module 18 that communicates with an information center such as a probe center or a Vehicle Information and Communication System (VICS (registered trademark)) center. (As used herein, the term "storage medium" is not intended to encompass transitory signals.) An external camera 19 and various sensors which are mounted on the vehicle equipped with the navigation system 1 are connected to the navigation system 1 via an in-vehicle network such as a CAN. A vehicle control ECU 20 that performs various controls of the vehicle equipped with the navigation system 1 is also connected to the navigation system 1 so that the navigation system 1 and the vehicle control ECU 20 can communicate with each other in two ways. Various operation buttons 21 mounted on the vehicle, such as an autonomous driving start button, are also connected to the navigation system 1.

The components of the navigation system 1 will be sequentially described below.

The current position detection unit 11 is comprised of a GPS 22, a vehicle speed sensor 23, a steering sensor 24, a gyro sensor 25, etc. and can detect the current position and orientation of the vehicle, the traveling speed of the vehicle, the current time, etc. In particular, the vehicle speed sensor 23 is a sensor that detects the distance traveled by the vehicle and the vehicle speed. The vehicle speed sensor 23 generates pulses according to rotation of drive wheels of the vehicle and outputs pulse signals to the navigation ECU 13. The navigation ECU 13 counts the number of generated pulses to calculate the rotational speed of the drive wheels and the traveled distance. The navigation system 1 need not necessarily include all of these four sensors. The navigation system 1 may include only one or more of these sensors.

The data recording unit 12 includes a hard disk (not shown) serving as an external storage device and a recording medium, and a recording head (not shown) serving as a driver for reading a map information DB 31, a predetermined program, etc. recorded on the hard disk and writing predetermined data on the hard disk. The data recording unit 12 may be comprised of a flash memory, a memory card, or an optical disk such as a CD or a DVD instead of the hard disk. The map information DB 31 may be stored in an external server, and the navigation system 1 may obtain the map information DB 31 by communication with the external server.

The map information DB 31 is storage means having stored therein, e.g., link data 34 regarding roads (links), node data 35 regarding node points, search data 36 that is used for processing associated with a route search and a route change, facility data regarding facilities, map display data for displaying a map, intersection data regarding intersections, search data for searching for locations, etc.

The link data 34 includes: regarding links of roads, data indicating the width, gradient, cant, and bank of the road to which the link belongs, the road surface condition, a merging section, the road structure, the number of lanes of the road, a location where the number of lanes decreases, a location where the road narrows, a railroad crossing, etc.; regarding corners, data indicating the radius of curvature, an intersection, a T-junction, the entrance and exit of the corner, etc.; regarding road attributes, data indicating a downhill road, an uphill road, etc.; and regarding road types, data indicating a local road such as a national road, a prefectural road, or a narrow street, and a toll road such as a national expressway, an urban expressway, an automobile road, a local toll road, or a toll bridge. In particular, in the present embodiment, information is also stored which specifies road connection for each lane (more specifically, the shapes of a merging point and a branch point, and which lane connects to which road at the merging point and the branch point) in addition to classification of lanes of roads.

Specifically, the "numbers of lanes," the "line types of lane markings," and the "connection types of lanes" are stored in the map information DB 31 as the information that specifies classification of lanes of roads and road connection for each lane. The "numbers of lanes" is information indicating the number of lanes (e.g., 1, 2, 3, etc.) of each road. The "line types of lane markings" is information indicating the type of each lane marking (e.g., solid line, dashed line, zebra, etc.). The "connection types of lanes" is information indicating, for each lane, how lanes of each road change (e.g., continue, add, end, divide, and merge).

"Zebra," which is a "line type of lane markings," is a marking that is used at a branch point or a merging point to indicate the start of merging or the end of branching of a road and to allow vehicles to appropriately merge or branch off. "Zebra" is slant white lines drawn at predetermined intervals. An example of "Zebra" is a channelizing strip. "Continue," which is a "connection type of lanes," means that the number of lanes does not increase or decrease. "Add" means that the number of lanes increases. "End" means that the number of lanes decreases. "Divide" means that the number of lanes increases as a single lane divides into a plurality of lanes. "Merge" means that the number of lanes decreases as a plurality of lanes merge into a single lane. For each change point where the lane configuration changes (each location where the number of lanes increases or decreases, each location where the line type of lane markings changes, etc.) in a road network in all over the country, information about the "numbers of lanes," the "line types of lane markings," and the "connection types of lanes" is stored regarding sections at and after the change point.

The navigation ECU 13 can specify classification of lanes of roads and road connection for each lane by obtaining, from the map information DB 31, information about the "numbers of lanes," the "line types of lane markings," and the "connection types of lanes" in the direction in which the vehicle is traveling. For example, the number of lane at each location can be specified by the "numbers of lanes." In addition to a section where a lane merges with another lane and a section where a vehicle can make a lane change to an added lane, the boundary between a main road and a merging or added lane (i.e., classification between main roads and lanes other than the main roads) in the case where a lane merges into or is added to a main road can be specified by the "line types of lane markings." For each lane, whether a lane is an existing lane that will continue, an added lane, or a lane that will end can be specified by the "connection types of lanes."

Figure 2:
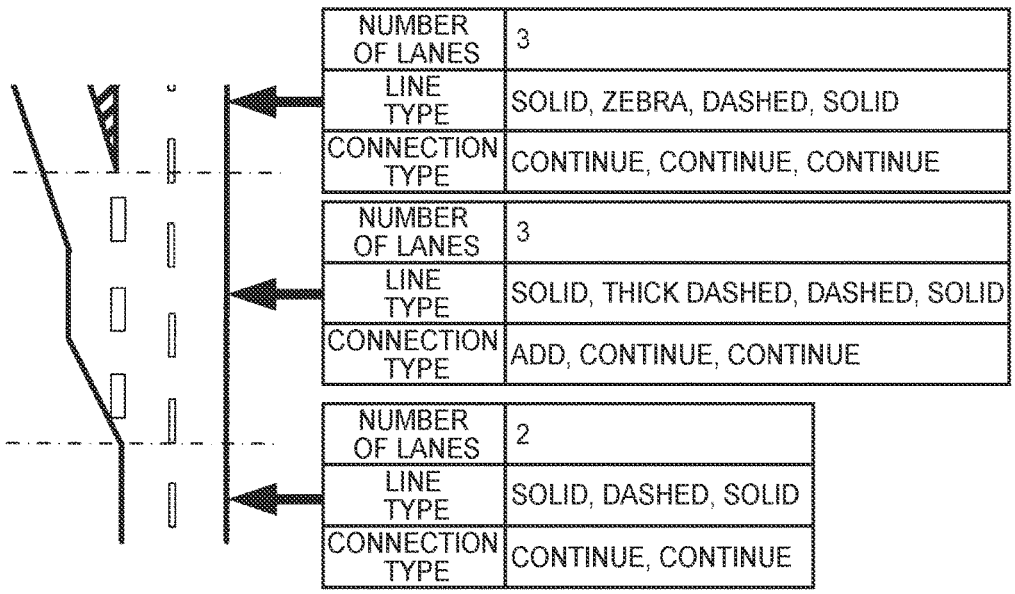
FIG. 2 is a diagram showing an example of map information of a road section which is stored in a map information DB.
Figure 3:
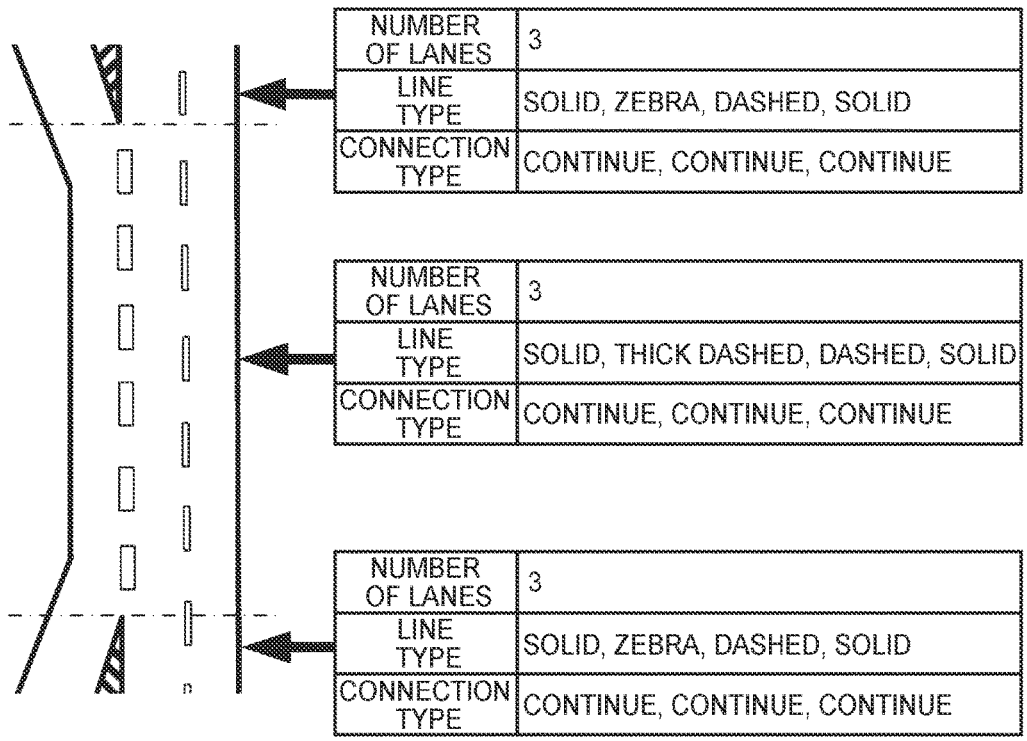
FIG. 3 is a diagram showing an example of map information of a road section which is stored in the map information DB.

FIGS. 2 and 3 are diagrams each showing an example of various information of a road section which is stored in the map information DB 31. For example, regarding a road section shown in FIG. 2, the navigation ECU 13 can refer to the information and can specify that a new lane is added to the left of a two-lane main road at a branch point and that the added lane branches off in a different direction from the other lanes. Regarding a road section shown in FIG. 3, the navigation ECU 13 can refer to the information and can specify that a two-lane road and a single-lane road merge from different directions at a merging point to form a three-lane road section and that the three-lane road section divides back into a two-lane road and a single-lane road at a branch point located after the merging point so as to branch in different directions.

The node data 35 includes data regarding the coordinates (positions) of node points that are set at branch points (including intersections, T-junctions, etc.) of actual roads and that are set at predetermined intervals on each road according to the radius of curvature etc., node attributes indicating whether the node is a node corresponding to an intersection or not etc., a connection link number list that is a list of link numbers of links connecting to the node, an adjacent node number list that is a list of node numbers of nodes each located adjacent to the node with a link therebetween, the height (altitude) of each node point, etc.

The search data 36 includes various data to be used for route search processing of searching for a route from a departure point (e.g., the current position of the vehicle) to a set destination. Specifically, cost calculation data to be used to calculate search cost such as cost showing a quantified level of appropriateness of a route regarding an intersection (hereinafter referred to as intersection cost) and cost showing a quantified level of appropriateness of a route regarding each link of a road (hereinafter referred to as link cost) is stored as the search data 36.

The navigation electronic control unit (ECU) 13 is an electronic control unit that generally controls the navigation system 1. The navigation ECU 13 includes: a CPU 41 serving as an arithmetic unit and a control unit; and internal storage devices such as a RAM 42 that is used as a working memory when the CPU 41 performs various arithmetic operations and that stores route data etc. when a route search is conducted, a ROM 43 having recorded thereon an autonomous driving assistance program (see FIGS. 4 and 5) described below etc. in addition to a control program, and a flash memory 44 that stores a program read from the ROM 43. The navigation ECU 13 forms various means serving as processing algorithms. For example, planned route specifying means specifies a planned route to be taken by the vehicle in the case where the vehicle travels with autonomous driving assistance. Vehicle control means executes autonomous driving assistance for the vehicle according to the planned route specified by the planned route specifying means. Route determining means determines if a guidance route for guiding the vehicle has been set. Road information obtaining means obtains road information that specifies classification of lanes located ahead in the direction in which the vehicle is traveling and road connection for each lane.

The operation unit 14 is operated to enter a departure point as a travel start point and a destination as a travel end point etc. and is formed by a plurality of operation switches (not shown) such as various keys and buttons. The navigation ECU 13 performs control to execute various associated operations based on switch signals output in response to depression etc. of the switches. The operation unit 14 may be formed by a touch panel that is provided on the front surface of the liquid crystal display 15. Alternatively, the operation unit 14 may be formed by a microphone and a speech recognition device.

A map image including roads, traffic information, operation guidance, an operation menu, key guidance, guidance information about a guidance route, news, a weather forecast, time, emails, TV programs, etc. are displayed on the liquid crystal display 15. In the present embodiment, in the case where autonomous driving assistance is started or cancelled, guidance on start or cancellation of autonomous driving assistance is also displayed on the liquid crystal display 15. An HUD or an HMD may be used instead of the liquid crystal display 15.

The speaker 16 outputs voice guidance on the travel along a guidance route or a lane change route 33 and guidance on traffic information, based on commands from the navigation ECU 13. In the present embodiment, in the case where autonomous driving assistance is started or cancelled, the speaker 16 also outputs voice guidance on start or cancellation of autonomous driving assistance.

Drive modes of the vehicle include traveling with autonomous driving assistance in which the vehicle autonomously travels along a preset route or along the road without user's driving maneuvers, in addition to manual driving in which the vehicle travels based on user's driving maneuvers. For example, in driving with autonomous driving assistance, the current position of the vehicle, the current lane of the vehicle, and the position of other traffic around the vehicle are detected as needed, and the vehicle control ECU 20 autonomously performs vehicle control such as control of steering, a driving source, and a brake so that the vehicle travels along a preset route or along the road. In particular, as described later in the present embodiment, a planned route to be taken by the vehicle is specified and the content of control is set based on the planned route.

Specifically, in the present embodiment, the following five types of autonomous driving assistance are executed according to the specified planned route.

(1) "Constant speed cruising" . . . . The vehicle is controlled to travel in the same lane at a predetermined set speed (e.g., 90% of the speed limit of a road on which the vehicle is traveling).

(2) "Adaptive cruising" . . . . The vehicle is controlled to travel in the same lane at up to a set speed (e.g., 90% of the speed limit of a road on which the vehicle is traveling) while maintaining a certain distance (e.g., 10 m) to a vehicle ahead.

(3) "Speed management (curve)" . . . . When there is a curve ahead in the direction in which the vehicle is traveling, the vehicle is decelerated to a speed according to the radius of curvature of the curve by the time the vehicle enters the curve.

(4) "Speed management (exit road)" . . . . Acceleration of the vehicle is restrained when the vehicle travels in a deceleration lane (exit road) of an expressway etc.

(5) "Speed management (tollgate, stop sign, signal)" . . . . When there is a tollgate, a stop sign, or a signal ahead in the direction in which the vehicle is traveling, the vehicle is decelerated to a speed (e.g., 20 km/h) at which the vehicle can be stopped without placing a burden on an occupant of the vehicle by the time the vehicle reaches the tollgate, the stop sign (road sign), or the signal.

The following control is also performed in parallel with the controls (1) to (5).

(6) Control to keep the vehicle approximately centered in the lane without causing lane deviation (e.g., lane keeping assistance).

For example, "constant speed cruising" or "adaptive cruising" is basically performed in the case where a planned route does not have a special road shape such as a curve. Special control according to the road shape (e.g., "speed management (curve)," "speed management (exit road)," etc.) is performed in the case where a planned route includes a special road shape such as a curve. When traveling with autonomous driving assistance of the present embodiment, the vehicle is not controlled to make lane changes and right and left turns, and the vehicle basically travels in the same lane unless the user performs vehicle maneuvers to change lanes or to turn right or left.

The controls (1) to (6) for autonomous driving assistance may be performed either in all road sections or only when the vehicle is traveling on a freeway having gates (either manned or unmanned, and either toll or toll-free) at boundaries with other roads connecting to the freeway. Autonomous driving assistance is not necessarily executed when the vehicle travels in a section where the vehicle can travel autonomously (hereinafter referred to as an autonomous driving section), but is executed only in situations where execution of autonomous driving assistance is selected by the user and it is determined that the vehicle can travel with autonomous driving assistance. An example of situations where the vehicle cannot travel with autonomous driving assistance is a situation where road information required to execute autonomous driving assistance, such as lane markings, cannot be obtained.

There are cases where autonomous driving assistance is stopped when it is detected that the user has performed a specific vehicle maneuver of an accelerator, a brake, steering, etc. (hereinafter referred to as an override) while the vehicle is traveling with autonomous driving assistance. For example, the controls (1) to (5) are stopped when it is detected that the user has operated a brake. When it is detected that the user has performed a steering operation, the controls (1) to (5) are basically continued, but the control (6) is temporarily stopped until the operation is terminated.

The DVD drive 17 is a drive that can read data recorded on a recording medium such as a DVD or a CD. The DVD drive 17 plays music or videos, updates the map information DB 31, etc. based on the read data. A card slot for reading and writing a memory card may be provided instead of the DVD drive 17.

The communication module 18 is a communication device that receives traffic information, probe information, weather information, etc. transmitted from a traffic information center such as, e.g., a VICS center or a probe center. For example, the communication module 18 is a mobile phone or a DCM. Other examples of the communication module 18 include a vehicle-to-vehicle communication device for communication between vehicles, and a roadside-to-vehicle communication device for communication between a vehicle and a roadside unit.

The external camera 19 is, e.g., a camera using a solid state imaging element such as a CCD. The external camera 19 is attached to the vehicle at a position above a front bumper and is mounted such that its optical axis is tilted downward at a predetermined angle with respect to the horizontal direction. The external camera 19 captures an image of the road ahead in the direction in which the vehicle is traveling, when the vehicle travels in an autonomous driving section. The vehicle control ECU 20 processes the captured image to detect pavement markings on the road on which the vehicle is traveling, other traffic around the vehicle, etc. and performs autonomous driving assistance for the vehicle based on the detection result. The external camera 19 may be placed on the rear or side part of the vehicle instead of on the front part of the vehicle. Instead of the camera, a sensor such as a millimeter wave radar, vehicle-to-vehicle communication, or roadside-to-vehicle communication may be used as means for detecting other traffic. An illuminance sensor or a rain sensor may be mounted as means for detecting other surrounding environments.

The vehicle control ECU 20 is an electronic control unit that controls the vehicle equipped with the navigation system 1. The vehicle control ECU 20 is connected to each driving part of the vehicle such as steering, a brake, and an accelerator. In the present embodiment, the vehicle control ECU 20 executes autonomous driving assistance for the vehicle by controlling each driving part particularly after autonomous driving assistance is started in the vehicle. When the user performs an override during autonomous driving assistance, the vehicle control ECU 20 detects the override.

The navigation ECU 13 sends command signals regarding autonomous driving assistance to the vehicle control ECU 20 via a CAN after the vehicle starts to travel. The vehicle control ECU 20 executes autonomous driving assistance after the vehicle starts to travel, in response to the received command signals. The command signals contain information about the content of control for autonomous driving assistance (e.g., any of the controls (1) to (6)) to be executed on the vehicle and information instructing to start, stop, or change the control etc. Instead of the navigation ECU 13, the vehicle control ECU 20 may set the content of control for autonomous driving assistance. In that case, the vehicle control ECU 20 is configured to obtain information required to set the content of control for autonomous driving assistance, such as a guidance route, the condition of the vehicle, and map information of surrounding areas, from the navigation system 1.

Figure 4:
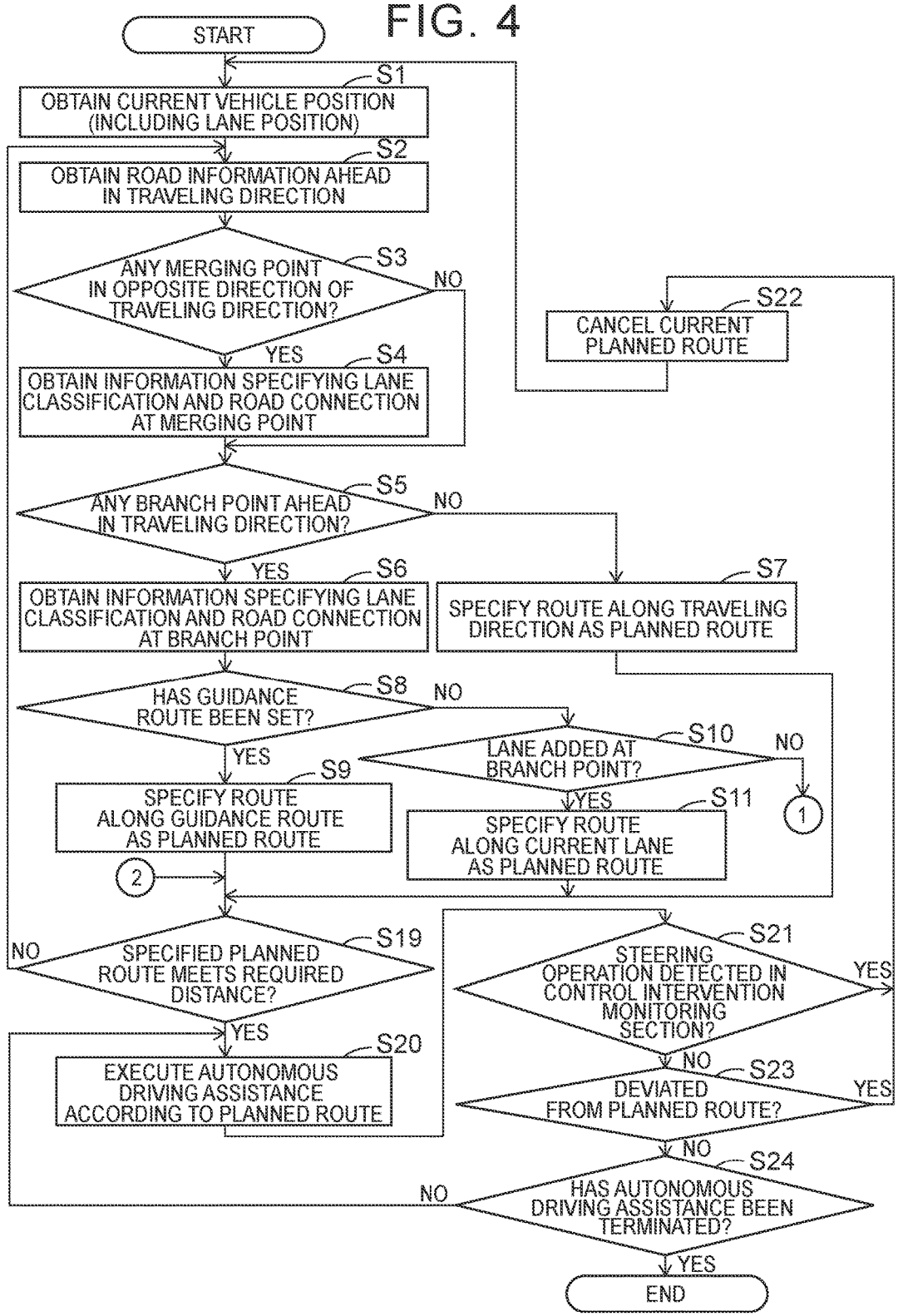
FIG. 4 is a flowchart of an autonomous driving assistance program according to an embodiment.
Figure 5:
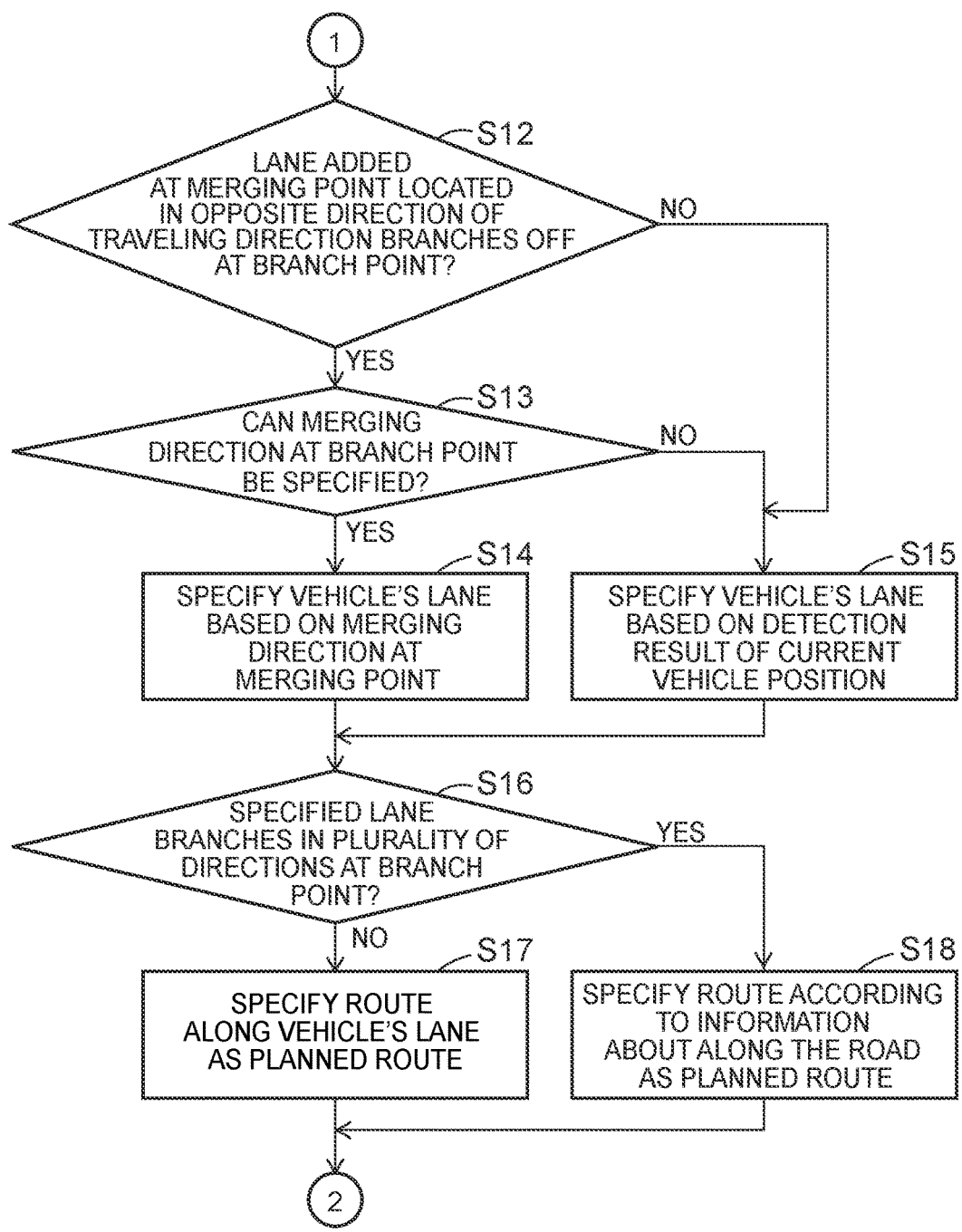
FIG. 5 is a flowchart of the autonomous driving assistance program according to the embodiment.

The autonomous driving assistance program that is executed by the CPU 41 in the navigation system 1 of the present embodiment having the above configuration will be described below based on FIGS. 4 and 5. FIGS. 4 and 5 are flowcharts of the autonomous driving assistance program according to the present embodiment. The autonomous driving assistance program is a program that is executed after an ACC power of the vehicle is turned on and that specifies a planned route to be taken by the vehicle and executes autonomous driving assistance based on the specified planned route. The autonomous driving assistance program may be executed only when autonomous driving assistance is being executed in the vehicle or may also be executed when the vehicle is traveling by manual driving. The program shown by the flowcharts of FIGS. 4 and 5 is stored in the RAM 42 or the ROM 43 of the navigation system 1 and is executed by the CPU 41.

An example in which the vehicle is traveling particularly in a main road of a freeway will be described below.

In the autonomous driving assistance program, the CPU 41 first obtains, in step (hereinafter abbreviated as S) 1, the current position of the vehicle detected by the current position detection unit 11. It is desirable that the current position of the vehicle be specified in detail by using high accuracy location technology. The high accuracy location technology is technology that enables the lane in which a vehicle is traveling and the accurate position of the vehicle to be detected by detecting, by image recognition, white lines and road surface paint information obtained from a camera mounted on the vehicle and checking the white lines and the road surface paint information with a pre-stored map information DB. Since details of the high accuracy location technology are known in the art, description thereof will be omitted. In the case where the vehicle is traveling on a road having a plurality of lanes, the lane in which the vehicle is traveling is also specified in S1.

Subsequently, in S2, the CPU 41 obtains from the map information DB 31 road information ahead in the direction in which the vehicle is traveling. The road information obtained in S2 includes information specifying the positions of branch points where a single route divides into a plurality of routes and merging points where a plurality of routes merges into a single route.

Subsequently, in S3, the CPU 41 determines based on the information obtained in S1 and S2 if there is any merging point within a predetermined distance (e.g., within 3 km) in the opposite direction that the vehicle is traveling.

If it is determined that there is a merging point within the predetermined distance in the opposite direction that the vehicle is traveling (S3: YES), the routine proceeds to S4. If it is determined that there is no merging point within the predetermined distance in the opposite direction that the vehicle is traveling (S3: NO), the routine proceeds to S5.

In S4, the CPU 41 specifies from the map information stored in the map information DB 31 classification of lanes of roads and road connection for each lane at the merging point determined to be present within the predetermined distance behind the vehicle in S3 (more specifically, the shape of the merging point and which lane is connected to which road at the merging point). As described above, the map information DB 31 has stored therein the "numbers of lanes," the "line types of lane markings," and the "connection types of lanes," and the CPU 41 specifies, based on the information stored in the map information DB 31, classification of lanes of roads and road connection for each lane at the merging point (FIGS. 2 and 3).

Subsequently, in S5, the CPU 41 determines based on the information obtained in S1 and S2 if there is any branch point within a predetermined distance (e.g., within 3 km) ahead in the direction in which the vehicle is traveling.

If it is determined that there is a branch point within the predetermined distance ahead in the direction in which the vehicle is traveling (S5: YES), the routine proceeds to S6. If it is determined that there is no branch point within the predetermined distance ahead in the direction in which the vehicle is traveling (S5: NO), the routine proceeds to S7.

In S6, the CPU 41 specifies from the map information stored in the map information DB 31 classification of lanes of roads and road connection for each lane at the branch point determined to be present within the predetermined distance ahead in S5 (more specifically, the shape of the branch point and which lane is connected to which road at the branch point). As described above, the map information DB 31 has stored therein the "numbers of lanes," the "line types of lane markings," and the "connection types of lanes," and the CPU 41 specifies, based on the information stored in the map information DB 31, classification of lanes of roads and road connection for each lane at the branch point (FIGS. 2 and 3). The routine then proceeds to S8.

In S7, the CPU 41 determines that, since there is no branch point ahead in the direction in which the vehicle is traveling, a route to be taken by the vehicle should be necessarily only one route along the direction in which the vehicle is currently traveling. The CPU 41 thus specifies the route along the direction in which the vehicle is currently traveling as a planned route. The routine then proceeds to S19.

In S8, the CPU 41 determines if a guidance route has been set in the navigation system 1. For example, if the user sets a destination when the vehicle starts to travel, route search processing is performed by using known Dijkstra's algorithm, and a guidance route is set from a plurality of candidates by user's operation.

If it is determined that a guidance route has been set in the navigation system 1 (S8: YES), the routine proceeds to S9. If it is determined that a guidance route has not been set in the navigation system 1 (S8: NO), the routine proceeds to S10.

In S9, the CPU 41 determines that, since a guidance route has been set in the navigation system 1, the vehicle is going to travel along the set guidance route. The CPU 41 thus specifies a route along the guidance route as a planned route. The routine then proceeds to S19.

Figure 6:
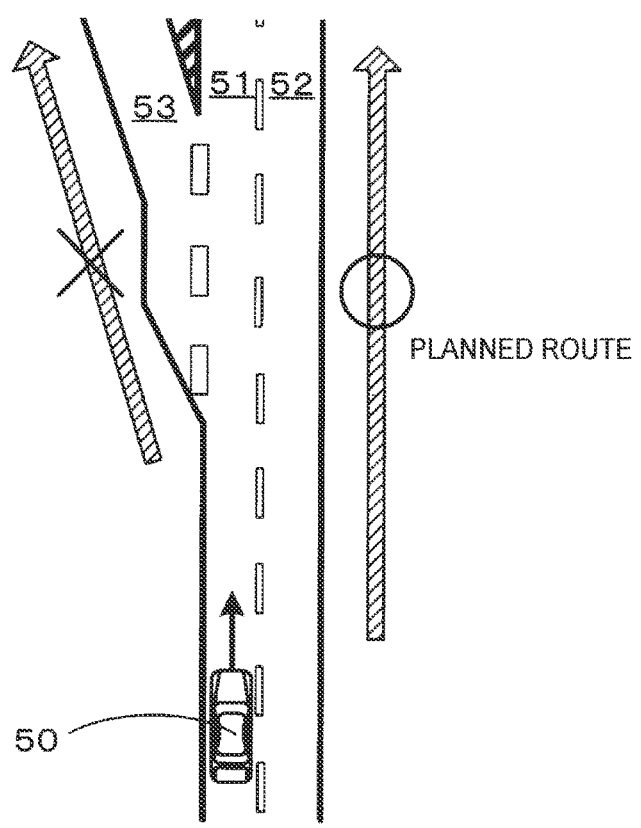
FIG. 6 is a diagram illustrating a method for specifying a planned route in the case where a lane is added and branches off from existing lanes.

In S10, the CPU 41 determines, based on the information about the branch point obtained in S6, if a new lane added at the branch point determined to be present within the predetermined distance ahead in S5 becomes a route different from an existing lane (that is, a lane of a main road in which the vehicle is traveling) at this branch point. Specifically, this corresponds to the case where a new lane 53 is added to existing lanes 51, 52 at a position ahead in the direction in which a vehicle 50 is traveling so that the new lane 53 branches off from the existing lanes 51, 52, as shown in FIG. 6.

If it is determined that a new lane added at the branch point determined to be present within the predetermined distance ahead becomes a route different from an existing lane at this branch point (S10: YES), the routine proceeds to S11. If it is determined that a new lane added at the branch point determined to be present within the predetermined distance ahead does not become a route different from an existing lane at this branch point (S10: NO), the routine proceeds to S12.

In S1, the CPU 41 determines that, as a route that is to be taken by the vehicle on the presumption that the vehicle travels without changing lanes, a single route can be specified based only on the road information. The single route thus specified is used as a planned route. Specifically, a route along a lane in which the vehicle is currently traveling is specified as a planned route. For example, in the case where the new lane 53 is added to the existing lanes 51, 52 at a position ahead in the direction in which the vehicle 50 is traveling so that the new lane 53 branches off from the existing lanes 51, 52 as shown in FIG. 6, there are two possible routes to be taken by the vehicle, namely a route along the existing lanes 51, 52 and a route along the lane 53, and the route along the existing lanes 51, 52 is specified as a planned route. The routine then proceeds to S19.

When traveling with autonomous driving assistance of the present embodiment, the vehicle does not autonomously make lane changes, as described above. Accordingly, the vehicle continues to travel in the same lane as the lane in which the vehicle is currently traveling unless the user intentionally performs a steering operation. A planned route can thus be specified as described above in S11 or as described below in S17. If the user performs a steering operation to change lanes, the planned route is cancelled as described below, and a planned route is specified again based on the new position of the vehicle (S22). Accordingly, for example, in the case where the vehicle 50 changes lanes to the new lane 53 in the situation shown in FIG. 6, the planned route along the lanes 51, 52 is cancelled, and a new planned route along the lane 53 is specified.

Figure 7:
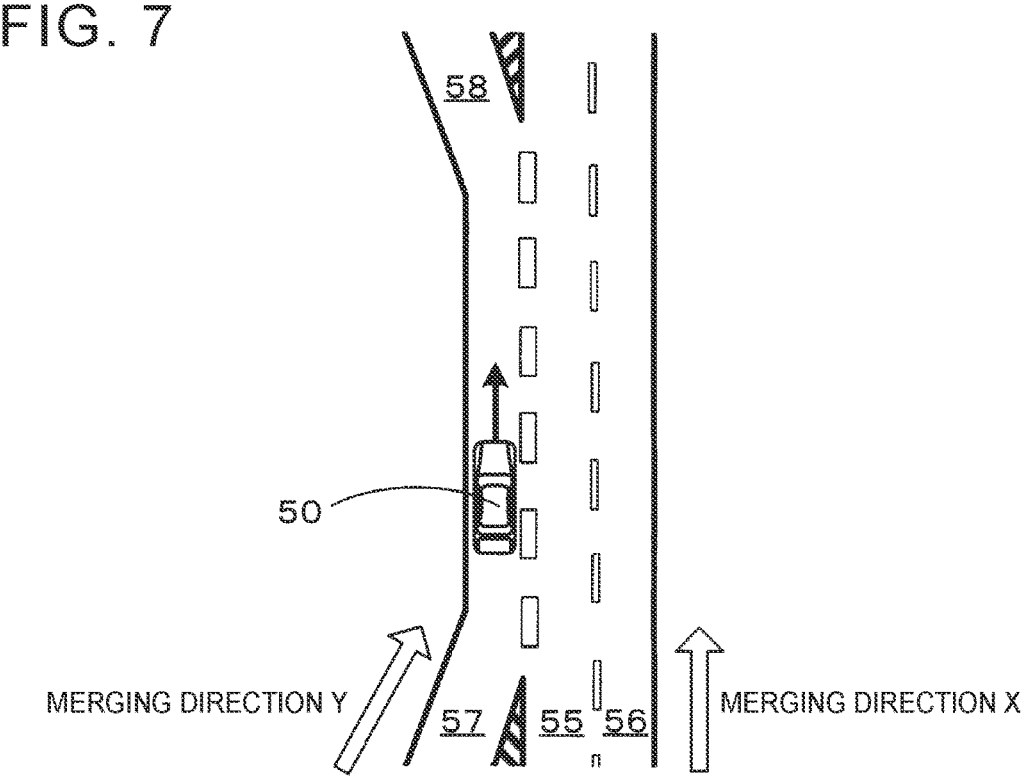
FIG. 7 is a diagram illustrating a method for specifying a planned route in the case where a merging point and a branch point are present successively.

In S12, the CPU 41 determines, based on the information about the merging point obtained in S4 and the information about the branch point obtained in S6, if there is a merging point within the predetermined distance in the opposite direction that the vehicle is traveling, and if a new lane added at the merging point does not end but becomes a route different from an existing lane (that is, a lane of a main road in which the vehicle is traveling) at the branch point determined to be present within the predetermined distance ahead in S5. Specifically, this corresponds to the case where a merging point where a new lane 57 merges to existing lanes 55, 56 is present in the opposite direction that the vehicle 50 is traveling, and the lane 57 does not end but continues and branches off from the existing lanes 55, 56 in a different direction at the branch point that is present ahead in the direction in which the vehicle 50 is traveling, as shown in FIG. 7.

If it is determined that there is a merging point within the predetermined distance in the opposite direction that the vehicle is traveling and that a new lane added at the merging point does not end but becomes a route different from an existing lane at the branch point determined to be present within the predetermined distance ahead (S12: YES), the routine proceeds to S13. If it is determined that there is no merging point within the predetermined distance in the opposite direction that the vehicle is traveling, or even if there is a merging point, if it is determined that a new lane added at the merging point is not such a lane that does not end but becomes a route different from an existing lane at the branch point determined to be present within the predetermined distance ahead (S12: NO), the routine proceeds to S15.

In S13, the CPU 41 determines, based on the travel history of the vehicle, if the direction in which the vehicle merged at the merging point determined to be present within the predetermined distance in the opposite direction that the vehicle is traveling in S12 has been able to be specified. For example, in the example shown in FIG. 7, the vehicle can merge in the following two directions at the merging point, namely the direction X in which the vehicle merges from the lane 55, 56 of the main road and the direction Y in which the vehicle merges from the lane 57 other than the main road.

If it is determined that the direction in which the vehicle merged at the merging point has been able to be specified (S13: YES), the routine proceeds to S14. If it is determined that the direction in which the vehicle merged at the merging point has not been able to be specified (S13: NO), the routine proceeds to S15.

In S14, the CPU 41 specifies a lane in which the vehicle is traveling, based on the direction in which the vehicle merged at the merging point determined to be present within the predetermined distance in the opposite direction that the vehicle is traveling. In the case where the CPU 41 cannot specify a single lane as a lane in which the vehicle is traveling, it specifies each candidate lane. When traveling with autonomous driving assistance of the present embodiment, the vehicle does not autonomously make lane changes, as described above. Accordingly, the vehicle continues to travel in the lane corresponding to the direction in which the vehicle merged unless the user intentionally performs a steering operation. The lane in which the vehicle is currently traveling can thus be specified. For example, in the example shown in FIG. 7, in the case where the vehicle merged in the direction X, it can be specified that the vehicle is traveling in one of the lanes 55, 56 of the main road. In the case where the vehicle merged in the direction Y, it can be specified that the vehicle is traveling in the lane 57. The routine then proceeds to S16.

In S15, the CPU 41 specifies a lane in which the vehicle is traveling, based on the detection result of the current position detected with detection devices (the GPS 22, the gyro sensor 25, the external camera 19, etc.) in S1. As described above, not only the current position (latitude and longitude) of the vehicle but also the lane in which the vehicle is traveling can be specified by using the high accuracy location technology. In the case where the CPU 41 cannot specify a single lane as a lane in which the vehicle is traveling, it specifies each candidate lane.

Figure 8:
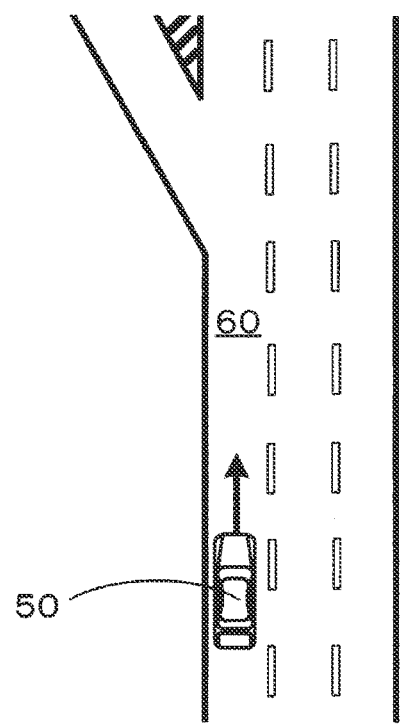
FIG. 8 is a diagram showing an example in which a planned route cannot be specified based on a lane in which a vehicle is traveling.
Figure 9:
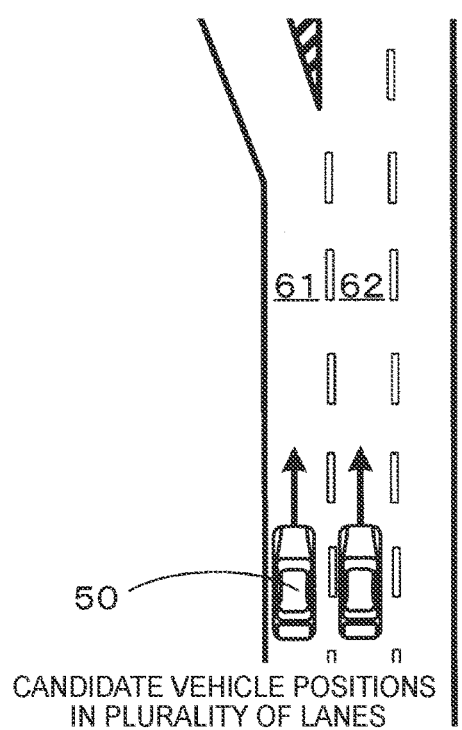
FIG. 9 is a diagram showing an example in which a planned route cannot be specified based on a lane in which a vehicle is traveling.

Subsequently, in S16, the CPU 41 determines if the vehicle's lane specified in S14 or S15 branches in a plurality of directions at the branch point located ahead in the direction in which the vehicle is traveling. If a single lane has been able to be specified as a lane in which the vehicle is traveling in S14 or S15, it is determined that the lane in which the vehicle is traveling branches in a plurality of directions at the branch point, in the case where a lane 60 specified as a lane in which the vehicle 50 is traveling branches in a plurality of directions at the branch point without being divided by lane markings as shown in FIG. 8. If a plurality of candidate lanes have been specified as a lane in which the vehicle is traveling in S14 or S15, it is determined that the lane in which the vehicle is traveling branches in a plurality of directions at the branch point, not only in the case where at least one of the candidate lanes branches in a plurality of directions at the branch point without being divided by lane markings as shown in FIG. 8 but also in the case where a plurality of candidate lanes 61, 62 branch off from each other in different directions as shown in FIG. 9.

Figure 10:
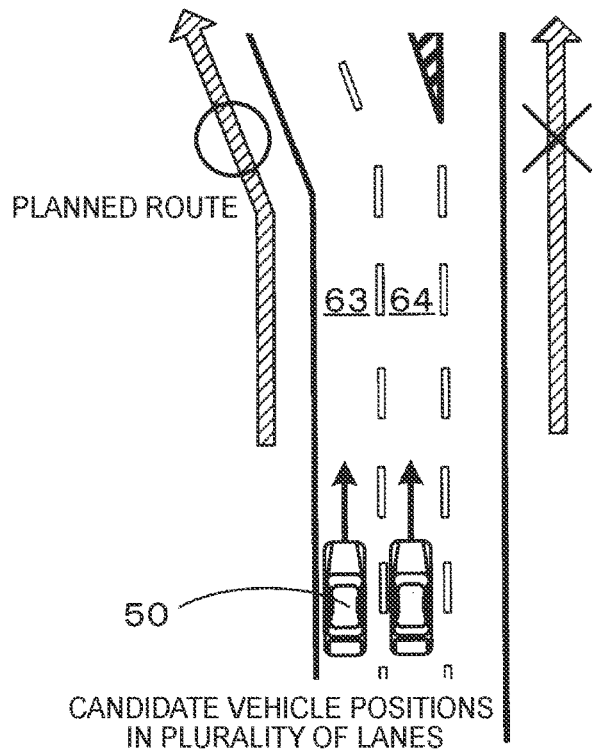
FIG. 10 is a diagram showing an example in which a planned route can be specified based on a lane in which a vehicle is traveling.

Even if a single lane has not been specified as a lane in which the vehicle is traveling in S14 or S15 and there are a plurality of candidate lanes, it is determined that the lane in which the vehicle is traveling does not branch in a plurality of directions at the branch point, in the case where both candidate lanes 63, 64 branch off in the same direction at the branch point as shown in FIG. 10, namely in the case where the route to be taken by the vehicle 50 is the same regardless of whether the vehicle 50 continues to travel in the candidate lane 63 or 64.

If it is determined that the lane in which the vehicle is traveling branches in a plurality of directions at the branch point located ahead in the direction in which the vehicle is traveling (S16: YES), the routine proceeds to S18. If it is determined that the lane in which the vehicle is traveling does not branch in a plurality of directions at the branch point located ahead in the direction in which the vehicle is traveling (S16: NO), the routine proceeds to S17.

In S17, the CPU 41 determines that, as a route that is to be taken by the vehicle on the presumption that the vehicle travels without changing lanes, a single route cannot be specified based only on the road information but can be specified by specifying a lane in which the vehicle is traveling and presuming that the vehicle continues to travel in the specified lane. A route along the lane in which the vehicle is currently traveling is thus used as a planned route. For example, in the case where it is specified that the vehicle 50 is traveling in either the lane 63 or 64 as shown in FIG. 10, a route along the lane 63, 64 is specified as a planned route. The routine then proceeds to S19.

Figure 11:
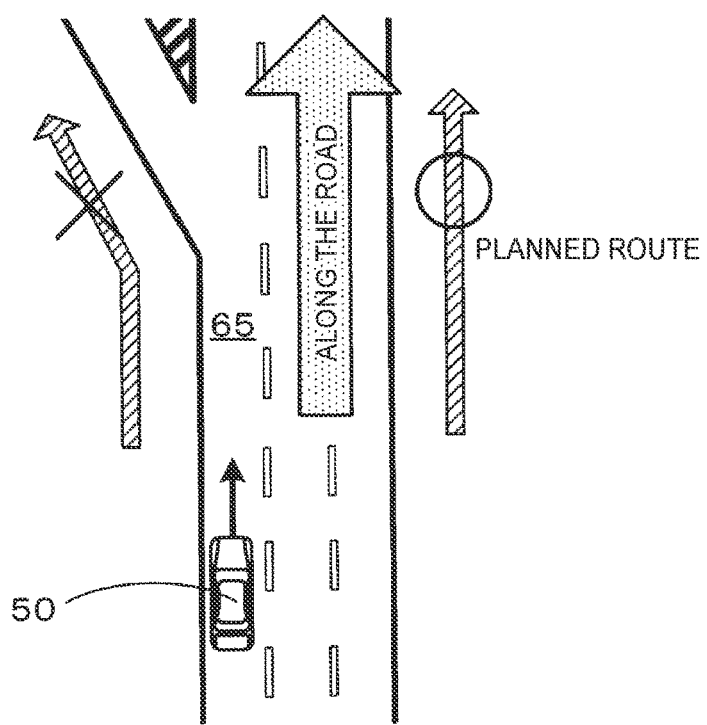
FIG. 11 is a diagram illustrating a method for specifying a planned route based on the relationship of "along the road."

In S18, the CPU 41 determines that, as a route that is to be taken by the vehicle on the presumption that the vehicle travels without changing lanes, a single route can be specified neither based only on the road information nor by specifying a lane in which the vehicle is traveling and presuming that the vehicle continues to travel in the specified lane. Accordingly, the CPU 41 obtains, from the map information DB 31 or the external server, information specifying the relationship of "along the road" between the roads, and specifies as a planned route a route going along the road of the route along which the vehicle is currently traveling. For example, in the case where it is specified that the vehicle 50 is traveling in a lane 65 and it is determined that the lane 65 branches in a plurality of directions at the branch point without being divided by lane markings as shown in FIG. 11, the CPU 41 cannot specify if the vehicle is going to travel straight, or obliquely to the left, at the branch point. Accordingly, the CPU 41 obtains information specifying the relationship of "along the road." In the case where the vehicle is going to travel straight if it travels along the road, the vehicle is likely to take such a route that the vehicle travels straight at the branch point. The CPU 41 therefore specifies this route as a planned route. The routine then proceeds to S19.

In S19, the CPU 41 determines if the distance of the planned route specified in S7, S9, S11, S17, or S18 meets a distance required to execute autonomous driving assistance. The "distance required to execute autonomous driving assistance" may be a fixed value (e.g., 300 m) or may vary depending on the type of autonomous driving assistance to be executed. For example, for "speed management (curve)" that requires more complicated control according to the road shape, the "distance required to execute autonomous driving assistance" may be set to a larger value than "constant speed cruising" and "adaptive cruising."

If it is determined that the distance of the planned route specified in S7, S9, S11, S17, or S18 meets the distance required to execute autonomous driving assistance (S19: YES), the routine proceeds to S20. If it is determined that the distance of the planned route specified in S7, S9, S11, S17, or S18 does not meet the distance required to execute autonomous driving assistance (S19: NO), the routine returns to S2, and the CPU 41 specifies a planned route in a section farther away from the vehicle.

In S20, the CPU 41 together with the vehicle control ECU 20 executes autonomous driving assistance based on the specified planned route. Specifically, autonomous driving assistance is switched as appropriate among (1) to (6) and executed according to the road shape and the road type of the planned route, features that are present on the route, etc. For example, in the case where the planned route has a straight shape, "constant speed cruising" or "adaptive cruising" is performed. In the case where the planned route has a curved shape, "speed management (curve)" is performed in preparation for the upcoming curve. In the case where the planned route includes a tollgate, a stop sign, or a signal, "speed management (tollgate, stop sign, signal)" is performed in preparation for passing through the tollgate, the stop sign, or the signal.

Subsequently, in S21, the CPU 41 determines based on the detection result of an override maneuver detected by the vehicle control ECU 20 if, of overrides, a vehicle maneuver for changing lanes has been performed in a control intervention monitoring section. For example, a steering operation to a predetermined angle or more corresponds to the vehicle maneuver for changing lanes.

Figure 12:
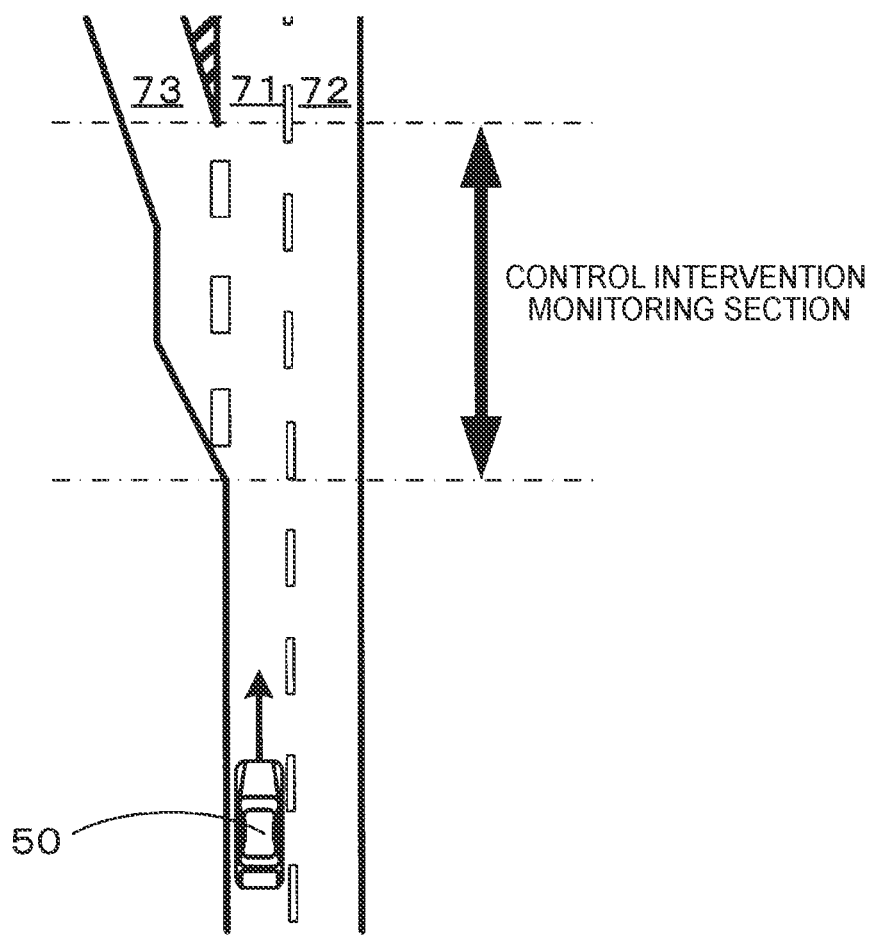
FIG. 12 is a diagram showing a control intervention monitoring section.

The control intervention monitoring section is a section where there is a possibility that a planned route may be changed due to a lane change. The control intervention monitoring section is specified based on various information about the "numbers of lanes," the "line types of lane markings," and the "connection types of lanes" (FIGS. 2 and 3) obtained from the map information DB 31. For example, in the case where a new lane 73 is added to existing lanes 71, 72 at a position ahead in the direction in which the vehicle 50 is traveling so that the new lane 73 branches off from the existing lanes 71, 72 as shown in FIG. 12, a route along the existing lanes 51, 52 is a possible route to be taken by the vehicle as described above, and is specified as a planned route (S11). However, if the vehicle 50 changes lanes from the lane 71, 72 to the lane 73, the vehicle 50 travels in the lane 73 and a planned route therefore needs to be changed. Accordingly, a section where the vehicle can change lanes from the lane 71, 72 to the lane 73 is a control intervention monitoring section.

If it is determined that a vehicle maneuver for changing lanes has been performed in a control intervention monitoring section (S21: YES), a new planned route needs to be specified, and the routine proceeds to S22. If it is determined that a vehicle maneuver for changing lanes has not been performed in a control intervention monitoring section (S21: NO), the routine proceeds to S23.

In S22, the CPU 41 cancels the currently specified planned route. The routine then returns to S1 and the CPU 41 specifies a planned route again based on the new position of the vehicle, namely the vehicle position after the vehicle maneuver. However, in the case where a guidance route has been set in the navigation system 1 and a route along the guidance route has been specified as a planned route (S9), the planned route is reliable. Accordingly, the CPU 41 may not cancel the planned route just by detecting a steering operation in a control intervention monitoring section. Even in this case, however, the CPU 41 may cancel the planned route if the vehicle has deviated from the planned route (S23: YES).

Subsequently, in S23, the CPU 41 compares the current position of the vehicle with the currently specified planned route and determines if the vehicle has deviated from the planned route.

If it is determined that the vehicle has deviated from the planned route (S23: YES), a new planned route needs to be specified, and the routine proceeds to S22. If it is determined that the vehicle has not deviated from the planned route (S23: NO), it is presumed that the current planned route need not be changed, and the routine proceeds to S24.

In S24, the CPU 41 obtains the control state of autonomous driving assistance by communication with the vehicle control ECU 20 via the CAN and determines if the vehicle has terminated autonomous driving assistance. For example, autonomous driving assistance is terminated when the ACC power is turned off, when the user selects to terminate autonomous driving assistance by performing an operation of the various operation buttons 21 mounted on the vehicle such as the autonomous driving start button, when a specific override such as a brake operation is detected, or when the vehicle enters a road section where autonomous driving assistance cannot be executed (e.g., a section where lane markings cannot be recognized).

If it is determined that the vehicle has terminated autonomous driving assistance (S24: YES), the autonomous driving assistance program is terminated. If it is determined that the vehicle is still executing autonomous driving assistance (S24: NO), the routine returns to S20.

As described in detail above, in the navigation system 1 according to the present embodiment, the autonomous driving assistance method that is performed by the navigation system 1, and the computer program that is executed by the navigation system 1, in the case where a vehicle travels with autonomous driving assistance, it is determined if a guidance route for guiding the vehicle has been set in the navigation system 1 (S8). If it is determined that a guidance route has been set, a route along the guidance route is specified as a planned route (S9). If it is determined that a guidance route has not been set, a planned route is specified based on the road information that specifies classification of lanes located ahead in the direction in which the vehicle is traveling and road connection for each lane (S11, S17, S18), and autonomous driving assistance for the vehicle is executed according to the specified planned route (S20). A planned route to be taken by the vehicle can thus be specified by using the "line types of lane markings" and the "connection types of lanes." In particular, even if a guidance route has not been set in the navigation system 1, a planned route to be taken by the vehicle can be more quickly and accurately specified as compared to conventional examples as the planned route to be taken by the vehicle is specified based on classification of lanes located ahead in the direction in which the vehicle is traveling and road connection for each lane. This allows the vehicle to appropriately travel with autonomous driving assistance based on the specified planned route.

Various improvements and modifications can be made in other embodiments without departing from the spirit and scope of the above embodiment.

Figure 13:
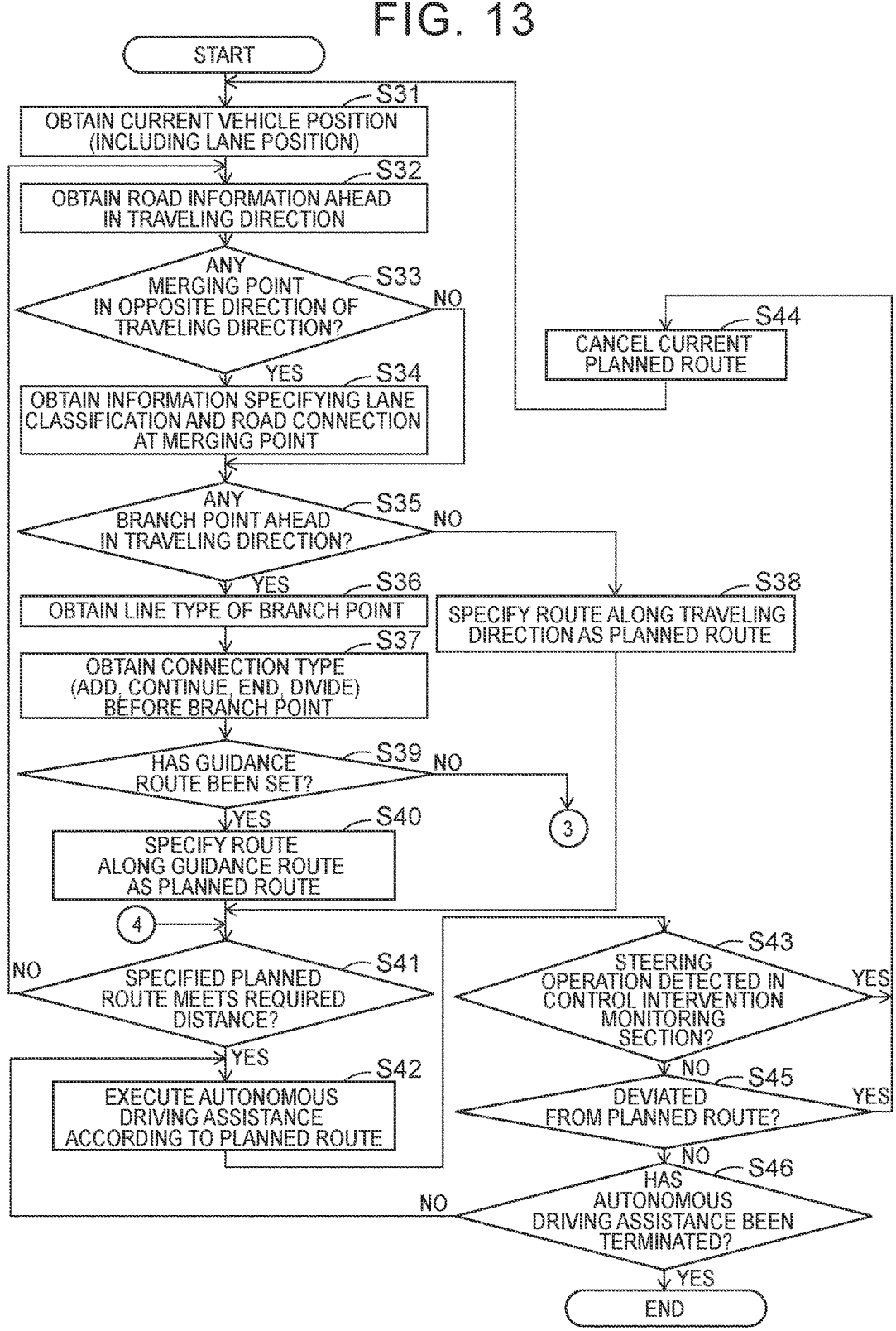
FIG. 13 is a diagram illustrating a modification of the autonomous driving assistance program.
Figure 14:
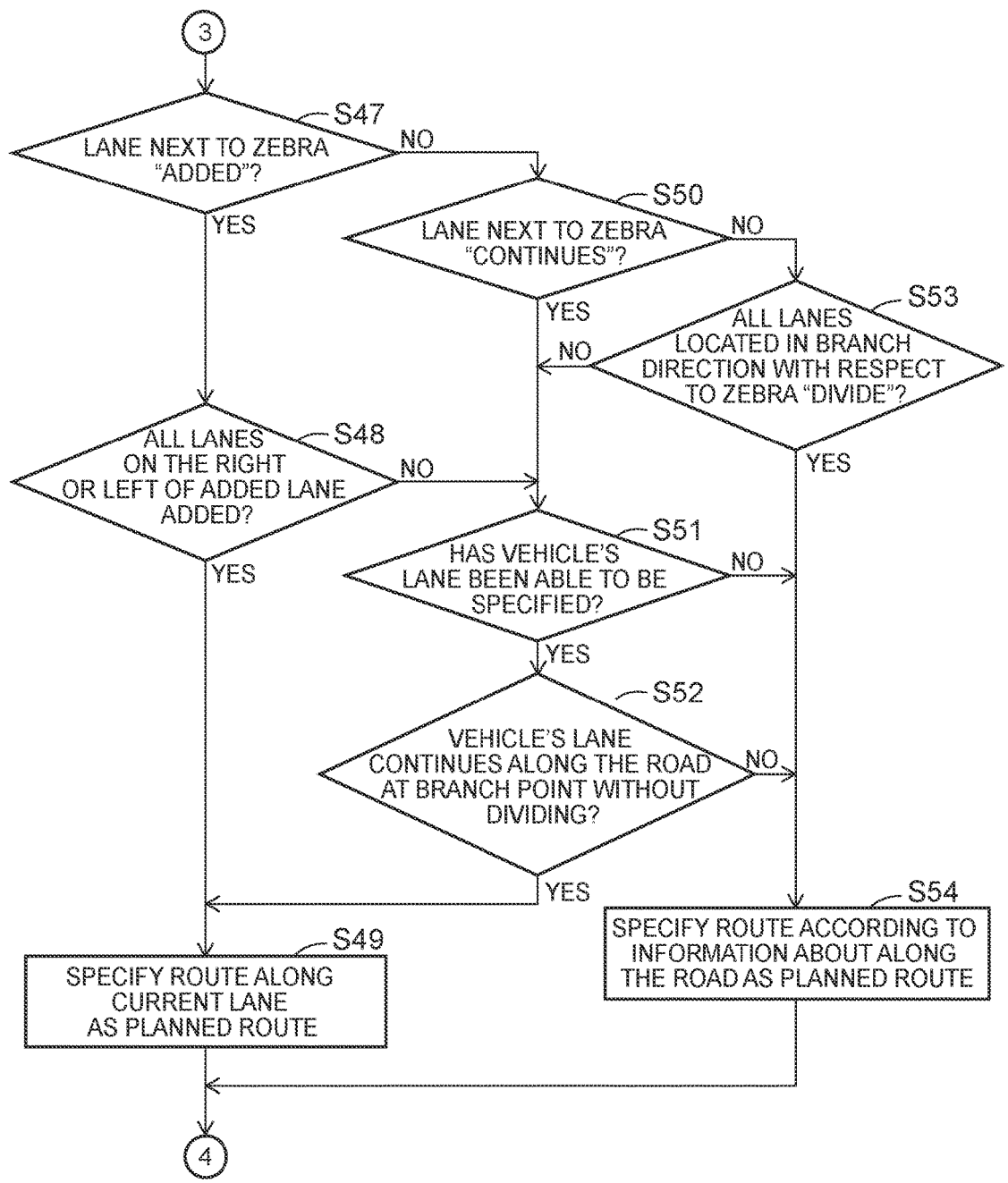
FIG. 14 is a diagram illustrating the modification of the autonomous driving assistance program.

For example, the autonomous driving assistance program (FIGS. 4 and 5) that is executed by the CPU 41 in the navigation system 1 according to the present embodiment may be configured as follows. FIGS. 13 and 14 are diagrams showing a modification of the autonomous driving assistance program according to the present embodiment.

Since the processing of S31 to S35 is similar to that of S1 to S5 described above, description thereof will be omitted.

First, in S36, the CPU 41 obtains, from the map information stored in the map information DB 31, the "line types of lane markings" at the branch point as one piece of information that specifies classification of lanes of the road and road connection for each lane at the branch point determined to be present within the predetermined distance ahead in S35. As described above, the map information DB 31 has stored therein the "numbers of lanes," the "line types of lane markings," and the "connection types of lanes" (FIGS. 2 and 3).

Subsequently, in S37, the CPU 41 obtains, from the map information stored in the map information DB 31, the "connection types of lanes" of the road located before (i.e., on the vehicle side of) the branch point as one piece of information that specifies classification of lanes of the road and road connection for each lane at the branch point determined to be present within the predetermined distance ahead in S35. The routine then proceeds to S39.

In S38, the CPU 41 determines that, since there is no branch point ahead in the direction in which the vehicle is traveling, a route to be taken by the vehicle should be necessarily only one route along the direction in which the vehicle is currently traveling. The CPU 41 thus specifies the route along the direction in which the vehicle is currently traveling as a planned route. The routine then proceeds to S41.

In S39, the CPU 41 determines if a guidance route has been set in the navigation system 1. For example, if the user sets a destination when the vehicle starts to travel, route search processing is performed by using known Dijkstra's algorithm, and a guidance route is set from a plurality of candidates by user's operation.

If it is determined that a guidance route has been set in the navigation system 1 (S39: YES), the routine proceeds to S40. If it is determined that a guidance route has not been set in the navigation system 1 (S39: NO), the routine proceeds to S47.

In S40, the CPU 41 determines that, since a guidance route has been set in the navigation system 1, the vehicle is going to travel along the set guidance route. The CPU 41 thus specifies a route along the guidance route as a planned route. The routine then proceeds to S41.

Since the subsequent processing of S41 to S46 is similar to that of S19 to S24 described above, description thereof will be omitted.

Figure 15:
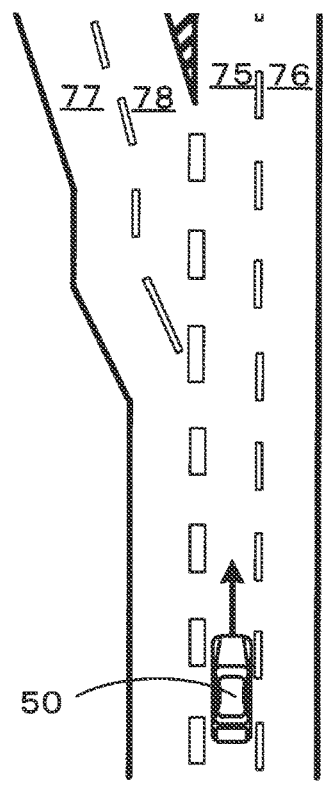
FIG. 15 is a diagram illustrating a method for specifying a planned route in the case where an existing lane branches off and a lane is added thereto.
Figure 16:
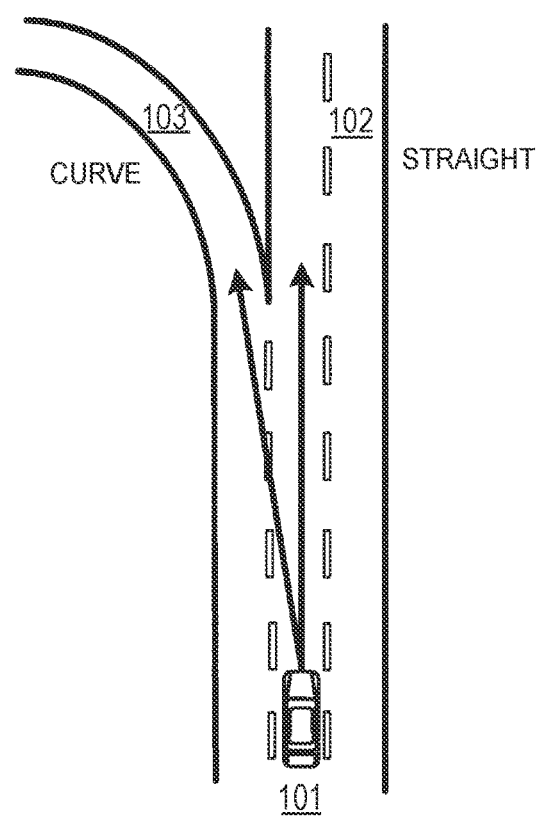
FIG. 16 is a diagram illustrating a conventional problem.

In S47, the CPU 41 determines, based on the information about the "line types of lane markings" at the branch point obtained in S36 and the "connection types of lanes" of the road located before (i.e., on the vehicle side of) the branch point obtained in S37, if there is at least one "zebra" in the "line types of lane markings" at the branch point and if a lane next to the lane marking of "zebra" is "add." Specifically, this corresponds to the case where existing lanes 75 to 77 branch and a new lane 78 is added next to the lane 77 that branches off from the lanes 75, 76 as shown in FIG. 15, in addition to the case where the new lane 53 is added to the existing lanes 51, 52 at a position ahead in the direction in which the vehicle 50 is traveling so that the new lane 53 branches off from the existing lanes 51, 52 as shown in FIG. 6.

If it is determined that there is at least one "zebra" in the "line types of lane markings" at the branch point and a lane next to the lane marking of "zebra" is "add" (S47: YES), the routine proceeds to S48. If it is determined that there is no "zebra" in the "line types of lane markings" at the branch point, or even if there is any "zebra," if it is determined that a lane next to the lane marking of "zebra" is not "add" (S47: NO), the routine proceeds to S50.

In S48, the CPU 41 determines if all lanes located either on the right or on the left of the lane for which the "connection type of lane" has been determined to be "add" in S47 are "add."

If it is determined that all lanes located either on the right or on the left of the lane for which the "connection type of lane" has been determined to be "add" in S47 are "add" (S48: YES), that is, if no existing lane branches and a lane is added as shown in FIG. 6, the routine proceeds to S49. If it is determined that lanes located either on the right or on the left of the lane for which the "connection type of lane" has been determined to be "add" in S47 include a lane other than "add" (S48: NO), that is, if an existing lane branches and a lane is added as shown in FIG. 15, the routine proceeds to S51.

In S49, the CPU 41 determines that, as a route that is to be taken by the vehicle on the presumption that the vehicle travels without changing lanes, a single route can be specified based only on the road information. The single route thus specified is used as a planned route. Specifically, a route along a lane in which the vehicle is currently traveling is specified as a planned route. For example, in the case where the new lane 53 is added to the existing lanes 51, 52 at a position ahead in the direction in which the vehicle 50 is traveling so that the new lane 53 branches off from the existing lanes 51, 52 as shown in FIG. 6, there are possible routes to be taken by the vehicle, namely a route along the existing lanes 51, 52 and a route along the lane 53, and the route along the existing lanes 51, 52 is specified as a planned route. The routine then proceeds to S41.

In S50, the CPU 41 determines, based on the information about the "line types of lane markings" at the branch point obtained in S36 and the "connection types of lanes" of the road located before (i.e., on the vehicle side of) the branch point obtained in S37, if there is at least one "zebra" in the "line types of lane markings" at the branch point and if a lane next to the lane marking of "zebra" is "continue." Specifically, this corresponds to the case where the existing lanes 55 to 57 branch at the branch point located ahead in the direction in which the vehicle 50 is traveling, as shown in FIG. 7.

If it is determined that there is at least one "zebra" in the "line types of lane markings" at the branch point and a lane next to the lane marking of "zebra" is "continue" (S50: YES), the routine proceeds to S51. If it is determined that there is no "zebra" in the "line types of lane markings" at the branch point, or even if there is any "zebra," if it is determined that a lane next to the lane marking of "zebra" is not "continue" (S50: NO), the routine proceeds to S53.

Subsequently, in S51, the CPU 41 determines if a lane in which the vehicle is traveling has been able to be specified. As described above, in the case where there is a merging point before the branch point and the direction in which the vehicle merged at the merging point can be specified, a lane in which the vehicle is traveling is specified based on the direction in which the vehicle merged at the merging point (S14). Alternatively, a lane in which the vehicle is traveling may be specified based on the detection result of the current position detected with the detection devices (the GPS 22, the gyro sensor 25, the external camera 19, etc.) in S31 (S15).

If it is determined that a lane in which the vehicle is traveling has been able to be specified by any of the above methods (S51: YES), the routine proceeds to S52. If it is determined that a lane in which the vehicle is traveling has not been able to be specified (S51: NO), the routine proceeds to S54.

In S52, the CPU 41 determines, based on the information about the "line types of lane markings" at the branch point obtained in S36 and the "connection types of lanes" of the road located before (i.e., on the vehicle side of) the branch point obtained in S37, if the lane in which the vehicle is traveling does not divide at the branch point like the lane 60 in FIG. 8 but branches off at the branch point (that is, if the lane in which the vehicle is traveling corresponds to one direction, namely the direction in which the lane branches off at the branch point).

If it is determined that the lane in which the vehicle is traveling does not divide but branches off at the branch point (S52: YES), it is determined that a single route cannot be specified based only on the road information, but can be specified as a route to be taken by the vehicle by specifying a lane in which the vehicle is traveling and presuming that the vehicle continues to travel in the specified lane. A route along the lane in which the vehicle is currently traveling is thus used as a planned route. For example, in the case where it is specified that the vehicle 50 is traveling in either the lane 63 or 64 as shown in FIG. 10, a route along the lane 63, 64 is specified as a planned route. The routine then proceeds to S41.

If it is determined that the lane in which the vehicle is traveling divides etc. and that a single route cannot be specified as a route to be taken by the vehicle even if the lane in which the vehicle is traveling has been specified (S52: NO), the routine proceeds to S54.

In S53, the CPU 41 determines, based on the information about the "line types of lane markings" at the branch point obtained in S36 and the "connection types of lanes" of the road located before (i.e., on the vehicle side of) the branch point obtained in S37, if there is at least one "zebra" in the "line types of lane markings" at the branch point and if all lanes located in the branching direction with respect to the lane marking of "zebra" are "divide."

If it is determined that there is at least one "zebra" in the "line types of lane markings" at the branch point and all lanes located in the branching direction with respect to the lane marking of "zebra" are "divide" (S53: YES), the routine proceeds to S54. If it is determined that there is no "zebra" in the "line types of lane markings" at the branch point, or even if there is any "zebra," if it is determined that all lanes located in the branching direction with respect to the lane marking of "zebra" are not "divide" (S53: NO), the routine proceeds to S51.

In S54, the CPU 41 determines that a single route cannot be specified, based only on the road information, as a route that is to be taken by the vehicle on the presumption that the vehicle travels without changing lanes, and that a route to be taken by the vehicle cannot be specified since a lane in which the vehicle is traveling cannot be specified or that a route to be taken by the vehicle cannot be specified even if a lane in which the vehicle is traveling is specified. Accordingly, the CPU 41 obtains, from the map information DB 31 or the external server, information specifying the relationship of "along the road" between the roads, and specifies as a planned route a route going along the road of the route along which the vehicle is currently traveling. For example, in the case where existing lanes branch off and a lane in which the vehicle 50 is traveling cannot be specified as shown in FIG. 10, or in the case where it is specified that the vehicle 50 is traveling in the lane 65 and it is determined that the lane 65 branches (divides) in a plurality of directions at the branch point without being divided by lane markings as shown in FIG. 11, the CPU 41 cannot specify if the vehicle is going to travel straight, or obliquely to the left, at the branch point. Accordingly, the CPU 41 obtains information specifying the relationship of "along the road." In the case where the vehicle is going to travel straight if it travels along the road, the vehicle is likely to take such a route that the vehicle travels straight at the branch point. The CPU 41 therefore specifies this route as a planned route. The routine then proceeds to S41.

In the embodiment, the user manually makes lane changes even when autonomous driving assistance is being executed. However, lane changes may be autonomously made with autonomous driving assistance. Making right and left turns, stopping, starting, etc. may also be autonomously performed with autonomous driving assistance.

In the embodiment, a method for specifying a planned route is described with respect to an example in which a vehicle is traveling particularly on a main road of a freeway. However, even when the vehicle is traveling on a road other than a main road of a freeway or on a local road, a planned route to be taken by the vehicle can be specified by executing the autonomous driving assistance program (FIGS. 4 and 5) to obtain road information and specify a lane in which the vehicle is traveling.

In the embodiment, a planned route is specified only when autonomous driving assistance is being executed. However, a planned route may be specified even when the vehicle is traveling by manual driving. This allows autonomous driving assistance to be appropriately executed according to a planned route specified in advance, even immediately after the vehicle is switched from traveling by manual driving to traveling with autonomous driving assistance.

In the embodiment, controlling all of an accelerator operation, a brake operation, and a steering wheel operation, which are maneuvers related to the vehicle behavior out of vehicle maneuvers, by the vehicle control ECU 20 is described as autonomous driving assistance that is executed so that the vehicle travels autonomously without user's driving maneuvers. In the autonomous driving assistance, however, the vehicle control ECU 20 may control at least one of the accelerator operation, the brake operation, and the steering wheel operation, which are the maneuvers related to the vehicle behavior out of the vehicle maneuvers. Manual driving based on user's driving maneuvers is described as driving in which the user performs all of the accelerator operation, the brake operation, and the steering wheel operation, which are the maneuvers related to the vehicle behavior out of the vehicle maneuvers.

In the embodiment, the navigation system 1 executes the autonomous driving assistance program (FIGS. 4 and 5). However, the vehicle control ECU 20 may execute the autonomous driving assistance program. In that case, the vehicle control ECU 20 obtains the current position of the vehicle, map information, etc. from the navigation system 1.

Devices having a route search function can replace the navigation system 1 in other embodiments. For example, embodiments may include to mobile phones, smartphones, tablet computers, personal computers, etc. (hereinafter referred to as the "mobile terminals etc."). Embodiments may include systems formed by a server and a mobile terminal etc. In that case, each step of the above autonomous driving assistance program (FIGS. 4 and 5) may be performed by the server and any of the mobile terminal etc. In an embodiment utilizing a mobile terminal etc., a vehicle capable of executing autonomous driving assistance and the mobile terminal etc. need to be connected (either wired or wireless) so that they can communicate with each other.

Although the embodiment of the autonomous driving assistance system is described above, the autonomous driving assistance system may have the following configurations. In that case, the autonomous driving assistance system has the following effects.

For example, a first configuration is as follows.

An autonomous driving assistance system includes: road information obtaining means for obtaining road information that specifies line types of lane markings and connection types of lanes; planned route specifying means for specifying, when a vehicle travels with autonomous driving assistance, a planned route to be taken by the vehicle based on the road information; and vehicle control means for executing the autonomous driving assistance for the vehicle according to the planned route specified by the planned route specifying means.

According to the autonomous driving assistance system having the above configuration, a planned route to be taken by the vehicle can be specified by using the "line types of lane markings" and the "connection types of lanes." In particular, even if a guidance route has not been set, a planned route to be taken by the vehicle can be more quickly and accurately specified as compared to conventional examples as the planned route to be taken by the vehicle is specified based on classification of lanes located ahead in a direction in which the vehicle is traveling and road connection for each lane. This allows the vehicle to appropriately travel with autonomous driving assistance based on the specified planned route.

A second configuration is as follows.

The autonomous driving assistance system further includes: route presuming and determining means for determining if a single route can be specified, based on the road information, as a route that is to be taken by the vehicle on a presumption that the vehicle travels without changing lanes. If the route presuming and determining means determines that a single route can be specified, the planned route specifying means specifies this route as the planned route.

According to the autonomous driving assistance system having the above configuration, if a single route can be specified as a route that is to be taken by the vehicle on the presumption that the vehicle does not change lanes, this route is specified as a planned route. Accordingly, a route to be taken by the vehicle can be accurately specified as a planned route until the vehicle changes lanes. In the case where the vehicle travels with autonomous driving assistance during which lane changes are not autonomously made, the vehicle basically does not change lanes while traveling. Accordingly, a sufficiently reliable planned route can be specified.

A third configuration is as follows.

If there is a branch point ahead in a direction in which the vehicle is traveling, the route presuming and determining means determines if a single route can be specified, based on the road information, as a route to be taken by the vehicle.

According to the autonomous driving assistance system having the above configuration, a planned route to be taken by the vehicle can be accurately specified based on the information about the line types of lane markings at the branch point and the information about the connection types of lanes at a position before the branch point.

A fourth configuration is as follows.

The road information about the line types of lane markings includes information about a lane marking indicating start of merging or an end of branching of a road, and the road information about the connection types of lanes includes information specifying that each lane is add, continue, end, divide, or merge.

According to the autonomous driving assistance system having the above configuration, a planned route to be taken by the vehicle can be accurately specified based on the information specifying how each lane changes at a position before a branch point.

A fifth configuration is as follows.

If there is at the branch point the lane marking indicating start of merging or an end of branching of a road and, as the information about the connection types of lanes, add has been set for a lane next to the lane marking indicating start of merging or an end of branching of a road, and, as the information about the connection types of lanes, add has been set for every lane located either on the right or on the left of the lane for which add has been set, the route presuming and determining means determines that a lane in which the vehicle is traveling does not branch at the branch point and another lane is added at the branch point, and determines that a single route can be specified as a route to be taken by the vehicle.

According to the autonomous driving assistance system having the above configuration, a planned route to be taken by the vehicle can be specified by using the "line types of lane markings" and the "connection types of lanes."

A sixth configuration is as follows.

The autonomous driving assistance system further includes: traveling lane specifying means for specifying a lane in which the vehicle is traveling. If there is at the branch point the lane marking indicating start of merging or an end of branching of a road and, as the information about the connection types of lanes, add has been set for a lane next to the lane marking indicating start of merging or an end of branching of a road, and, as the information about the connection types of lanes, add has been set for a single lane located on the right or on the left of the lane for which add has been set, and the traveling lane specifying means has specified a lane in which the vehicle is traveling, and as the information about the connection types of lanes, continue has been set for the lane in which the vehicle is traveling, the route presuming and determining means determines that the lane in which the vehicle is traveling does not divide but branches at the branch point, and determines that a single route can be specified as a route to be taken by the vehicle.

According to the autonomous driving assistance system having the above configuration, a planned route to be taken by the vehicle can be specified by using the "line types of lane markings" and the "connection types of lanes."

A seventh configuration is as follows.

The autonomous driving assistance system further includes: traveling lane specifying means for specifying a lane in which the vehicle is traveling. If there is at the branch point the lane marking indicating start of merging or an end of branching of a road and, as the information about the connection types of lanes, information other than add has been set for a lane next to the lane marking indicating start of merging or an end of branching of a road, and the traveling lane specifying means has specified a lane in which the vehicle is traveling, and as the information about the connection types of lanes, continue has been set for the lane in which the vehicle is traveling, the route presuming and determining means determines that the lane in which the vehicle is traveling does not divide but branches at the branch point, and determines that a single route can be specified as a route to be taken by the vehicle.

According to the autonomous driving assistance system having the above configuration, a planned route to be taken by the vehicle can be specified by using the "line types of lane markings" and the "connection types of lanes."

The invention claimed is:

1. An autonomous driving assistance system for a vehicle, comprising:
   a processor programmed to:
      access map information stored in a database;
      obtain road information that specifies line types of lane markings and connection types of lanes from the accessed map information;
      based on the obtained road information, determine whether a single route can be specified as a route that is to be taken by the vehicle, the determination being made based on a presumption that the vehicle travels without changing lanes;
      when the vehicle travels with autonomous driving assistance:
         if the single route can be specified, specify the single route as a planned route to be taken by the vehicle; and
         if the single route cannot be specified, specify a route along a road on which the vehicle is currently traveling as the planned route to be taken by the vehicle; and
      execute the autonomous driving assistance for the vehicle according to the specified planned route.

2. The autonomous driving assistance system according to claim 1, wherein the processor is programmed to:
   if there is a branch point ahead in a direction in which the vehicle is traveling, determine if the single route can be specified, based on the road information, as a route to be taken by the vehicle.

3. The autonomous driving assistance system according to claim 1, wherein
   the road information about the line types of lane markings includes information about a lane marking indicating start of merging or an end of branching of a road; and
   the road information about the connection types of lanes includes information specifying that each lane is "add," "continue," "end," "divide," or "merge."

4. The autonomous driving assistance system according to claim 3, wherein the processor is programmed to:
   if there is at the branch point the lane marking indicating start of merging or an end of branching of a road and, as the information about the connection types of lanes, add has been set for a lane next to the lane marking indicating start of merging or an end of branching of a road, and, as the information about the connection types of lanes, add has been set for every lane located either on the right or on the left of the lane for which add has been set, determine that a lane in which the vehicle is traveling does not branch at the branch point and another lane is added at the branch point, and determine that the single route can be specified as a route to be taken by the vehicle.

5. The autonomous driving assistance system according to claim 3, wherein the processor is programmed to:
   specify a lane in which the vehicle is traveling; and
   if there is at the branch point the lane marking indicating start of merging or an end of branching of a road and, as the information about the connection types of lanes, add has been set for a lane next to the lane marking indicating start of merging or an end of branching of a road, and, as the information about the connection types of lanes, add has been set for a single lane located on the right or on the left of the lane for which add has been set, and a lane in which the vehicle is traveling has been specified, and as the information about the connection types of lanes, continue has been set for the lane in which the vehicle is traveling, determine that the lane in which the vehicle is traveling does not divide but branches at the branch point, and determine that the single route can be specified as a route to be taken by the vehicle.

6. The autonomous driving assistance system according to claim 3, wherein the processor is programmed to:
  specify a lane in which the vehicle is traveling; and
  if there is at the branch point the lane marking indicating start of merging or an end of branching of a road and, as the information about the connection types of lanes, information other than add has been set for a lane next to the lane marking indicating start of merging or an end of branching of a road, and t a lane in which the vehicle is traveling has been specified, and as the information about the connection types of lanes, continue has been set for the lane in which the vehicle is traveling, determine that the lane in which the vehicle is traveling does not divide but branches at the branch point, and determine that the single route can be specified as a route to be taken by the vehicle.

7. An autonomous driving assistance method for a vehicle, comprising the steps of:
  accessing map information stored in a database;
  obtaining road information that specifies line types of lane markings and connection types of lanes from the accessed map information;
  based on the obtained road information, determining whether a single route can be specified as a route that is to be taken by the vehicle, the determination being made based on a presumption that the vehicle travels without changing lanes;
  when the vehicle travels with autonomous driving assistance:
    if the single route can be specified, specifying the single route as a planned route to be taken by the vehicle; and
    if the single route cannot be specified, specifying a route along a road on which the vehicle is currently traveling as the planned route to be taken by the vehicle; and
  executing the autonomous driving assistance for the vehicle according to the specified planned route.

8. A computer-readable storage medium storing a computer-executable autonomous driving assistance program for a vehicle that causes a computer to perform the following functions:
  accessing map information stored in a database;
  obtaining road information that specifies line types of lane markings and connection types of lanes from the accessed map information;
  based on the obtained road information, determining whether a single route can be specified as a route that is to be taken by the vehicle, the determination being made based on a presumption that the vehicle travels without changing lanes;
  when the vehicle travels with autonomous driving assistance:
    if the single route can be specified, specifying the single route as a planned route to be taken by the vehicle; and
    if the single route cannot be specified, specifying a route along a road on which the vehicle is currently traveling as the planned route to be taken by the vehicle; and
  executing the autonomous driving assistance for the vehicle according to the specified planned route.

* * * * *